United States Patent [19]

Nonomura

[11] Patent Number: 4,630,250

[45] Date of Patent: Dec. 16, 1986

[54] METHOD AND APPARATUS FOR SEARCHING AN ADDRESS SIGNAL ON VIDEO AND/OR AUDIO DISC

[75] Inventor: Tadao Nonomura, Tokorozawa, Japan

[73] Assignee: Pioneer Video Corporation, Tokyo, Japan

[21] Appl. No.: 754,185

[22] Filed: Jul. 9, 1985

Related U.S. Application Data

[63] Continuation of Ser. No. 433,423, Oct. 8, 1982, abandoned.

[30] Foreign Application Priority Data

Oct. 9, 1981 [JP] Japan ............................... 56-161249

[51] Int. Cl.$^4$ ........................ G11B 27/10; G11B 21/10
[52] U.S. Cl. ....................................... 369/32; 369/44; 369/111; 365/234; 360/72.2
[58] Field of Search ..................... 369/30, 32, 44, 111, 369/43, 33, 41; 365/234; 360/72.2, 75; 358/342

[56] References Cited

U.S. PATENT DOCUMENTS

| | | | |
|---|---|---|---|
| 3,851,116 | 11/1974 | Cannon | 360/73 |
| 4,106,058 | 8/1978 | Romeas | 369/32 |
| 4,199,820 | 4/1980 | Ohtake et al. | 365/234 |
| 4,323,997 | 4/1982 | Kuribayashi et al. | 369/33 |
| 4,330,880 | 5/1982 | Van Dijk | 369/44 |
| 4,375,091 | 2/1983 | Dakin | 360/72.2 |
| 4,555,736 | 11/1985 | Mathieu | 369/32 |

Primary Examiner—Alan Faber
Attorney, Agent, or Firm—Fleit, Jacobson, Cohn & Price

[57] ABSTRACT

In a video and/or audio disc information recording and reproducing apparatus including a coarse tracking control means, to coarsely vary the positions of the turntable and the pickup means relative to each other in a radial direction of the disc on the turntable, is driven to move in a direction and over a distance to lessen the difference between the address picked up and the address to be searched and at a speed varying with the absolute value of the difference between such addresses and decreasing at a deceleration rate which increases as absolute value decreases within a predetermined range. The apparatus includes a fine tracking control means to minutely vary the relative positions of the turntable and the pickup means. The fine tracking control is made operative when the absolute value is reduced to the lower limit of the above mentioned predetermined range and the coarse tracking control means is made inoperative.

13 Claims, 7 Drawing Figures

METHOD AND APPARATUS FOR SEARCHING AN ADDRESS SIGNAL ON VIDEO AND/OR AUDIO DISC

This application is a continuation-in-part of application Ser. No. 433,423, filed Oct. 8, 1982 now abandoned.

FIELD OF THE INVENTION

The present invention relates to a video and/or audio disc information recording and reproducing apparatus such as a video disc player and, more particularly, a method of searching a desired address signal out of the address signals recorded on a disc being played back in the recording and reproducing apparatus.

BACKGROUND OF THE INVENTION

A video and/or audio disc has recorded thereon not only video and/or audio information but also address signals respectively allocated to pieces of video and/or audio information. Desired pieces of video and/or audio information can thus be reproduced by picking up the address signal allocated to the particular pieces of information.

A video and/or audio disc information recording and reproducing apparatus, to play back such a disc, includes pickup means to pick up the information recorded on the disc rotating on a turntable, coarse tracking control means operative to coarsely vary the respective positions of the turntable and the pickup means relative to each other in a radial direction of the disc on the turntable, and fine tracking control means operative to minutely vary the relative positions of the turntable and the pickup means. In the case of an optical video and/or audio disc information recording and reproducing apparatus, the fine tracking control means comprises a tracking mirror which utilizes a beam of, for example, a laser, directed at a target information track of the disc. The tracking mirror is driven to deviate the laser beam in a radial direction of the disc so that the laser beam reflected from the mirror is correctly incident on the target track of the disc. The coarse tracking control means comprises a carriage carrying either the turntable or the pickup means and movable with respect to the pickup means or the turntable, respectively.

In a recording and reproducing apparatus of this nature, a desired address signal is picked up by comparing the latest address reached by the signal pickup beam with the address to be searched and driving the carriage for movement at a relatively high speed regulated on the basis of the detected difference between the address picked up and the address being searched. Difficulties are however encountered in searching an address in this manner since the carriage is liable to overrun or underrun the correct position in order to access the desired address when the detected difference between the latest address reached by the pickup beam and the address is utilized in the search. Such difficulties result from the force of inertia produced in the carriage being moved and the eccentricity which the disc inevitably has. To overcome these difficulties, the coarse tracking control is disabled before the desired address is reached by the signal pickup beam. After the the coarse tracking control means is thus made inoperative, the fine tracking control means is put into operation until the desired address signal is picked up by the pickup beam. The search for the address by the fine tracking control means is effected at a speed equal to the tracking speed for reproduction and, for this reason, can not be completed in a short period of time. The present invention contemplates provision of a method of searching for a desired address from a disc correctly and at a high speed.

SUMMARY OF THE INVENTION

In accordance with the present invention, there is provided a video and/or audio disc information recording and reproducing apparatus including: a turntable, to have carried thereon a video and/or audio disc to be played back; pickup means to pick up pieces of information recorded on the disc which further contains address signals; coarse tracking control means operative to coarsely vary the respective positions of the turntable and the pickup means relative to each other in a radial direction of the disc on the turntable; and fine tracking control means operative to minutely vary the relative positions of the turntable and the pickup means. A method of searching a desired address signal out of the detected address signals, comprising detecting address signals from the pieces of information picked up by the pickup means; producing a signal representative of the desired address signal to be searched; comparing the latest address signal picked up by the pickup means and the signal representative of the address to be searched and producing an address error signal representative of the difference between the two addresses; producing a first drive signal effective to produce a driving force for driving the coarse tracking control means to move in a direction and over a distance to lessen the difference between the address picked up and the address to be searched and at a speed varying in predetermined relationship to the absolute value of the difference and decreasing at a deceleration rate which increases as aforesaid absolute value decreases within a predetermined range; driving the coarse tracking control means in accordance with the first drive signal; modifying the deceleration rate of the coarse tracking control means for reducing the above mentioned driving force in predetermined relationship to the deceleration rate; and interrupting the supply of the first drive signal and producing a second drive signal effective to drive the fine tracking control means when the aforesaid absolute value is reduced to the lower limit of the above mentioned predetermined range. The above mentioned second drive signal preferably consists of a train of pulses corresponding in number to the absolute value of the detected difference between the address picked up and the address being searched.

The first signal preferably consists of a train of pulses having pulsewidths which decrease at a rate increasing as the above mentioned absolute value decreases within the above mentioned predetermined range. In this instance, the deceleration rate of the coarse tracking control means may be modified by detecting the deceleration rate of the coarse tracking control means and reducing the pulsewidths the drive pulse signal in predetermined relationship to the detected deceleration rate.

The coarse tracking control means is preferably driven by an electric motor in response to the first drive signal. In this instance, the deceleration rate of the coarse tracking control means may be modified by detecting the deceleration rate of the coarse tracking control means from the output speed of the motor and reducing the pulsewidths of the pulses in the drive pulse signal in accordance with a correction parameter which increases as the detected deceleration rate of the coarse tracking control means increases.

Alternatively, the deceleration rate of the coarse tracking control means may be modified by detecting the deceleration rate of the coarse tracking control means from the pulsewidths of the above mentioned pulses and reducing the pulsewidths in predetermined relationship to the detected deceleration rate and reducing the pulsewidths of the aforesaid pulses by a correction parameter which increases as the detected deceleration rate increases.

BRIEF DESCRIPTION OF THE DRAWINGS

The features and advantages of a method according to the present invention will be more clearly appreciated from the following description taken in conjunction with the accompanying drawings in which.

DETAILED DESCRIPTION OF THE INVENTION

Figure 1:
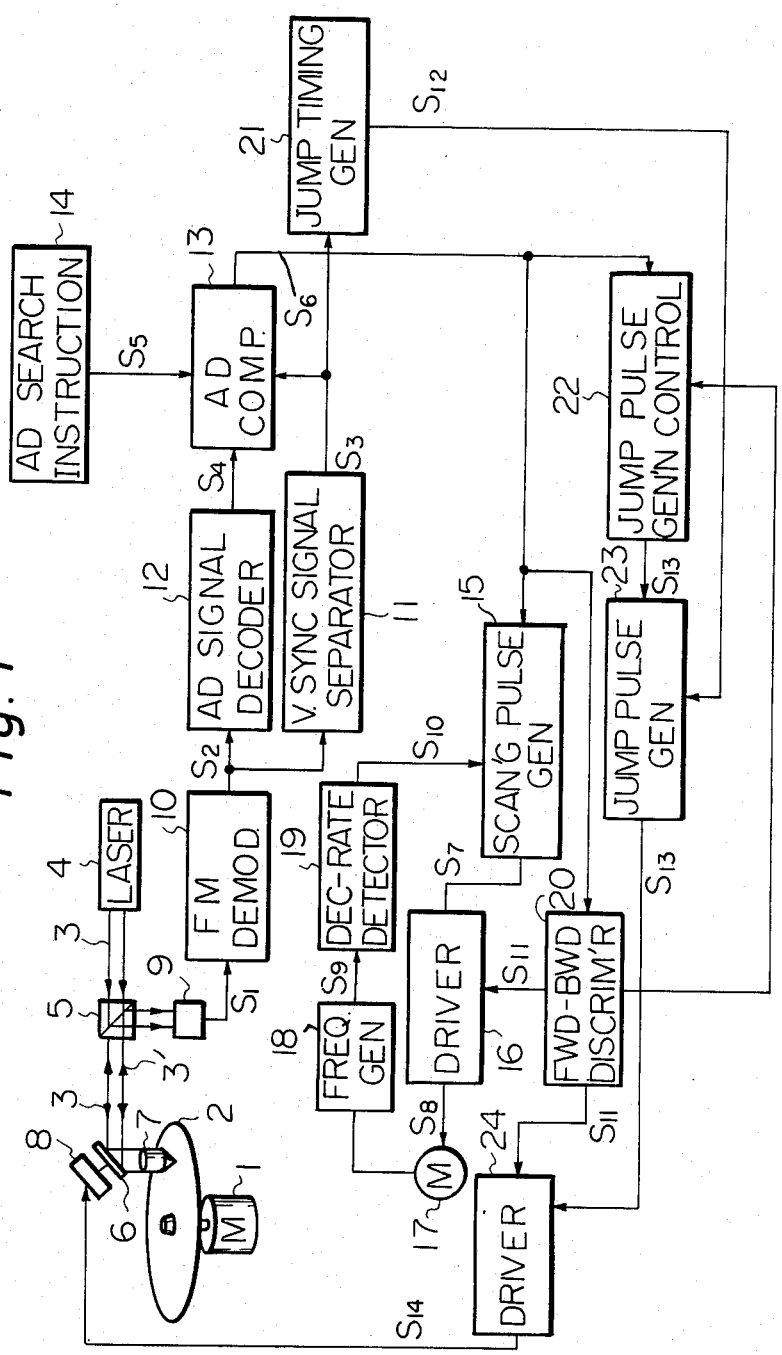
FIG. 1 is a block diagram showing a first preferred example of the system to carry out a method according to the present invention.

Referring to FIG. 1 of the drawings, a video and/or audio disc information recording and reproducing apparatus, incorporating the method according to the present invention, comprises a turntable (not shown) to be driven for rotation about the center axis thereof by means of a turntable drive unit 1, the construction of which is well known in the art. In operation, the turntable has placed thereon a video and/or audio disc 2 having an information-carrying surface formed with spiral or coaxial tracks each consisting of a succession of pits representative of the pieces of information recorded on the disc 2. These pieces of information are read out by a laser beam 3 emitted from a signal pickup assembly including a suitable laser radiation unit 4. In the path of the laser beam 3 thus emitted from the laser radiation unit 4 is located a beam splitter prism 5 which has a junction plane inclined at the angles of 45 degrees to the path of the beam 3 from the laser radiation unit 4. The laser beam 3 thus enters the beam splitter prism 5 at the angles of 45 degrees to the junction plane of the prism 5 and is incident on a tracking mirror 6 which reflects the beam 3 toward a focusing lens 7. The laser beam 3 reflected from the tracking mirror 6 is thus passed through the lens 7 and is focused on the information-carrying surface of the disc 2 rotating on the turntable. The tracking mirror 6 is angularly movable about an axis parallel with the information-carrying surface of the disc 2 and is driven for rotation about the axis by means of a mirror drive unit 8. The mirror drive unit 9 is operative to drive the tracking mirror 6, rotatably about the particular axis, under the control of a signal supplied to the drive unit 8 which is usually constituted by an electromagnetic transducer so that the laser beam 3 reflected from the tracking mirror lens 7 is caused to finely deflect radially of the rotating disc 2, viz., in a direction perpendicular to the coaxial or spiral tracks on the information-carrying surface of the disc 2 rotating with the turntable. On the other hand, the focusing lens 7 is positioned to have an optical axis normal to the information-carrying surface of the disc 2 and is movable toward and away from the disc 2 under the control of a signal supplied to a drive unit (not shown) provided in association with the lens 7 so that the laser beam 3 directed from the lens 7 toward the disc 2 is at all times focused correctly on the information-carrying surface of the disc 2 which is subject to warp microscopically.

The laser beam 3 incident on the information-carrying surface of the disc 2 "reads" the pieces of information recorded thereon and is reflected from the disc 2 as a beam of light 3' carrying the pieces of information read out from the disc 2. The information-carrying beam 3' is passed backwardly through the focusing lens 7 and is redirected from the tracking mirror 6 toward the beam splitter prism 5. The beam 3' thus entering the beam splitter prism 5 backwardly is reflected from the inclined junction plane of the prism 5 and is caused to advance from the junction plane toward a photoelectric transducer element 9 at the angles of 45 degrees to the path of the beam from the tracking mirror 6. The photoelectric transducer element 9 is operative to detect changes in the quantity of the light incident thereon from the beam splitter prism 5 and to produce an electric output signal $S_1$ representative of pieces of information carried on the beam 3'. The signal $S_1$ thus produced by the photoelectric transducer element 9 is fed to a frequency-modulated (FM) image-signal demodulator 10.

The frequency-modulated image-signal demodulator 10 produces an output signal $S_2$ in the form of, in the case of a video disc player, a video format signal which contains a vertical synchronizing signal $S_3$ and an address signal $S_4$ which is herein assumed, by way of example, as being representative of the number allocated to an image frame (or field) recorded on the disc 2. The image-signal demodulator 10 has an output terminal connected to a vertical synchronizing signal separator 11 and an address signal decoder 12 so that the address signal $S_4$ and vertical synchronizing signal $S_3$ contained in the format signal $S_2$ delivered from the demodulator 10 are extracted therefrom by the address signal decoder 12 and vertical synchronizing signal separator 11, respectively. The address signal $S_4$ thus supplied from the address signal decoder 12 is indicative of the number of the image frame on display, viz., the particular address recorded on the information track being scanned by the information pick-up beam 3. Such an address signal $S_4$ is fed, together, with the output signals $S_3$ from the vertical synchronizing signal separator 11, to an address comparator 13. The address comparator 13 thus having input terminals respectively connected to the address signal decoder 12 and the vertical synchronizing signal separator 11 further has an input terminal connected to an address search instruction unit 14 to which a signal $S_5$ representative of the address to be searched on the disc 2 is fed. The address comparator 13 thus supplied with the signals $S_3$, $S_4$ and $S_5$ is operative to compare the address represented by the signal $S_4$ from the address signal decoder 12 with the address represented by the address search instruction unit 13 and to produce, during a period of time corresponding to each of the image frames or fields, an address error signal $S_6$ representative of the detected difference between the addresses represented by the signals $S_4$ and $S_5$ if the two addresses do not conform to each other. The signal $S_6$ contains a piece of information representative of the absolute value /X/ of the detected difference between the addresses compared with each other and a piece of information representative of the positive or negative sign of the detected difference. The signal $S_6$ thus produced by the address comparator 13 is supplied to a scanning pulse generator 15.

The scanning pulse generator 15 has an output terminal connected to a carriage-motor driver 16 and is adapted to produce a scanning pulse signal $S_7$ composed of a train of pulses with pulsewidths f(X) varying with the address error signal $S_6$ supplied from the address comparator 13. The pulse signal $S_7$ thus produced by the scanning pulse generator 15 is fed to a carriage-motor driver 16 adapted to deliver a motor-drive pulse $S_8$ to a carriage-drive motor 17. The carriage-drive motor 17 is adapted to drive carriage or coarse tracking control means (not shown) carrying the signal pickup assembly or the turntable (and the turntable drive unit 1) and movable in a radial direction of the disc 2 with respect to the turntable or the pickup assembly, respectively. The output speed of the carriage-drive motor motor 17 is constantly detected by a frequency generator 18 which is thus operative to produce a frequency signal $S_9$ representative of the detected output speed of the carriage-drive motor 17 and to supply the signal $S_9$ to a deceleration-rate detector 19. The deceleration-rate detector 19 is adapted to detect from the signal $S_9$ a deceleration rate Y of the carriage or coarse tracking control means. The deceleration-rate detector 19 is thus operative to produce an output signal $S_{10}$ representative of the detected deceleration rate Y of the carriage means and to feed back the signal $S_{10}$ to the scanning pulse generator 15. In response to the signal $S_{10}$ thus supplied from the deceleration-rate detector 19, the scanning pulse generator 15 regulates the pulsewidths f(X) of the pulses in the motor-drive pulse signal $S_8$ to be supplied to the motor 17.

The output signal $S_6$ from the address comparator 13 is further fed to a forward-backward discriminator 20 which is responsive to the piece of information representative of the positive or negative sign of the address difference represented by the signal $S_6$. The forward-backward discriminator 20 is thus operative to supply the carriage-motor driver 16 with a signal $S_{11}$ indicative of the polarity of the motor-drive pulse signal $S_8$ to be supplied from the carriage-motor driver 16 to the carriage-drive motor 17 so that the output shaft of the motor 17 is to be driven for rotation in a direction to reduce the value /X/ represented by the address error signal $S_6$, viz., the difference between the latest address reached by the signal pickup beam 3 and the address being searched. The carriage means carrying the signal pickup assembly or the turntable is driven for movement with respect to the turntable or the signal pickup assembly, respectively, a distance dictated by the output signal $S_8$ from the carriage-motor driver 16 in a direction dictated by the output signal $S_{11}$ from the forward-backward discriminator 20, thereby reducing the value /X/ represented by the address error signal $S_6$ from the address comparator 13.

The vertical synchronizing signal separator 11 has its output terminal further connected to a jump timing generator 21 and the address comparator 13 has its output terminal further connected to a jump pulse generation control unit 22. The jump timing generator 21 is thus responsive to the output signal $S_3$ from the vertical synchronizing signal separator 11 and is operative to produce a jump timing signal $S_{12}$ indicative of the timing at which the signal pickup beam 3 is to jump over an information track of the disc 2 in synchronism with the timing at which the vertical synchronizing signal $S_3$ is produced. On the other hand, the jump pulse generation control unit 22 is responsive to the address error signal $S_6$ delivered from the address comparator 13 and is operative to produce a pulse signal $S_{13}$ consisting of a train of pulses when the value /X/ represented by the address error signal $S_6$ is less than a predetermined value (of, for example, 100). The jump timing generator 21 and the jump pulse generation control unit 22 have respective output terminals connected in parallel to a jump pulse generator 23 which is adapted to be triggered by the signal $S_{12}$ from the jump timing generator 21 and to pass the pulse signal $S_{13}$ therethrough in the presence of the signal $S_{12}$. The jump pulse generator 23 is connected in parallel with the forward-backward discriminator 20 to a tracking transducer driver 24 having an output terminal connected to the electromagnetic transducer constituting the previously mentioned mirror drive unit 8. The tracking transducer driver 24 is thus operative to to deliver a control signal 14 to the mirror drive unit 8 In response to the control signal $S_{14}$ supplied from the transducer driver 24, the mirror drive unit 8 is actuated to drive the tracking mirror 7 to turn through an angle dictated by the pulse signal $S_{13}$ fed from the jump pulse generator 23 and in a direction dictated by the signal $S_8$ from the forward-backward discriminator 20 so that the signal pickup beam 3 incident on the disc 2 is caused to finely deviate radially of the disc 2.

Figure 2:
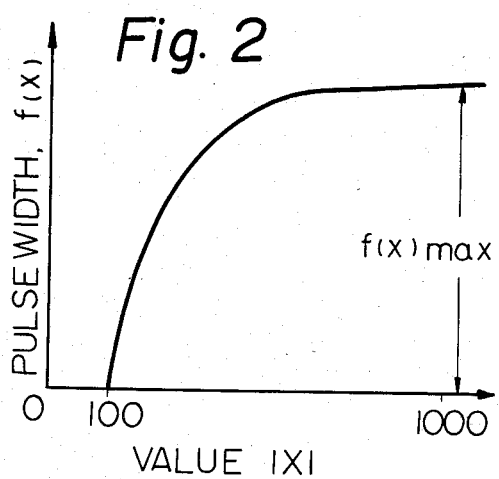
FIG. 2 is a graph showing an example of the relationship between the difference between the latest address picked up and the address to be searched and the pulsewidths of the pulse signal to drive the coarse tracking control means.

In FIG. 2 of the drawings is shown a plot a indicating the relationship between the absolute value /X/ of the difference between the latest address reached by the beam 3 and the address being searched and the pulsewidths f(X) of the pulses contained in the motor-drive pulse signal $S_8$ supplied to the carriage-drive motor 17. Such a relationship is stored as a table of data in the scanning pulse generator 15 and is herein assumed, by way of example, as being such that the value f(X) decreases at a rate which increases as the value /X/ decreases within the range of between 100 and 1000. For the value /X/ larger than 100, the pulsewidths f(X) of the pulses contained in the signal $S_8$ assume a predetermined maximum value f($X_{max}$). When the value /X/ is less than 100, the pulsewidths f(X) are maintained at zero.

Figure 5:
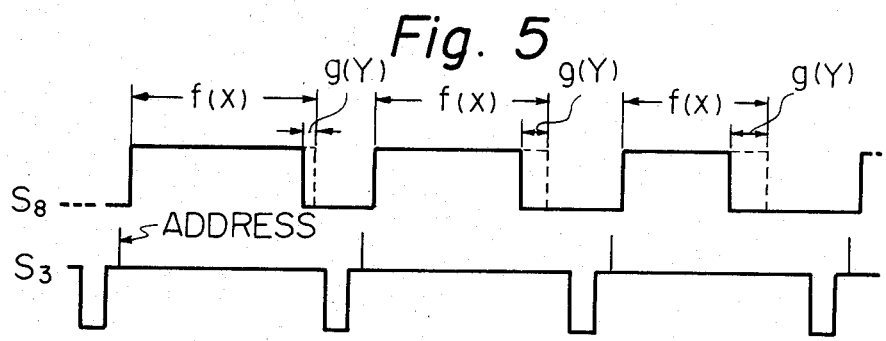
FIG. 5 is a view showing examples of the waveforms of the signal to drive the coarse tracking control means and the vertical synchronizing signal produced in a method according to the present invention.

FIG. 5 shows the respective waveforms of the signal $S_3$ produced by the vertical synchronizing signal separator 11 and the motor-drive pulse signal $S_8$ produced by the carriage-motor driver 16. As will be seen upon comparision between these waveforms, the duty ratio of the pulse signal $S_8$ varies with the pulsewidth f(X) of the pulses in the signal $S_8$ in cycles conforming to the cycles of the vertical synchronizing signal $S_3$. For the periods of time when positive pulses are appearing in the motor-drive pulse signal $S_8$, a current is supplied to the coil of the carriage-drive motor 17 and drives the carriage means for movement with respect to the turntable or the signal pickup assembly. In the absence of the positive pulses in the signal $S_8$, a braking force is applied to the carriage means. The driving force applied to the carriage means is for this reason governed by the duty ratio of the pulse signal $S_8$ supplied from the carriage-motor driver 16 to the carriage-drive motor 17 and accordingly by the pulsewidths f(X) of the positive pulses contained in the motor-drive pulse signal $S_8$. The amplitude of the pulse signal $S_8$ is determined in relation to the maximum driving current to be supplied to the carriage-drive motor so that the motor 17 can be accelerated at a maximum rate in the presence of the positive pulses in the signal $S_8$.

Figure 3:
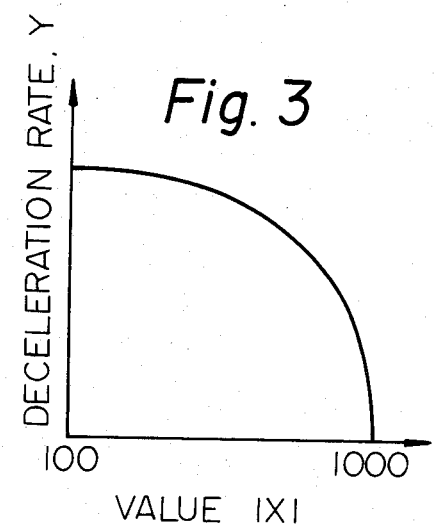
FIG. 3 is a graph showing an example of the relationship between the difference between the latest address picked up and the address to be searched and the deceleration rate of the coarse tracking control means.

Since the driving force to be applied to the carriage means varies with the pulsewidths f(X) of the pulses in the signal $S_8$ as above noted, the relationship between the value /X/ and the pulsewidths f(X) as indicated by the plot a shown in FIG. 2 is tantamount to the relationship between the value /X/ and the driving force to be applied to the carriage means. The carriage means is thus driven by the carriage-drive motor 17 with a force which decreases at a rate increasing as the value /X/ decreases within the range of between 100 and 1000. It therefore follows that the carriage means is driven to move radially of the disc 2 at a speed which decreases as the value /X/ decreases or, in other words, the latest address reached by the beam 3 approaches the address being searched. The rate of deceleration Y of the carriage means driven in this manner assumes relatively small values when the value /X/ is in the vicinity of 1000 but, as the value /X/ becomes closer to 100, the deceleration rate Y of the carriage means is increased abruptly and reaches a predetermined maximum value $Y_{max}$ when the value /X/ equals 100, as will be seen from the plot b shown in FIG. 3 of the drawings. Thus, the carriage means is driven for movement at relatively high speeds until the value /X/ reaches a certain range close to 100 and, when the value /X/ is reduced to such a range, the carriage means is driven to move at abruptly reduced speeds. When the value /X/ is reduced to 100, the speed of movement of the carriage means becomes substantially zero.

The carriage means being driven for movement by the carriage-drive motor 17 is subjected to a force of inertia proportional to the deceleration rate Y which is varied as above described. The speed of movement of the carriage means is for this reason actually not reduced to zero and as a consequence the carriage means is caused to overrun or underrun the position to be reached when the value /X/ is reduced to zero. In the method according to the present invention, the pulsewidths f(X) of the pulse in the motor-drive pulse signal s8 are modified to enable the carriage means to stop in the correct position when the value /X/ is reduced to zero.

Figure 4:
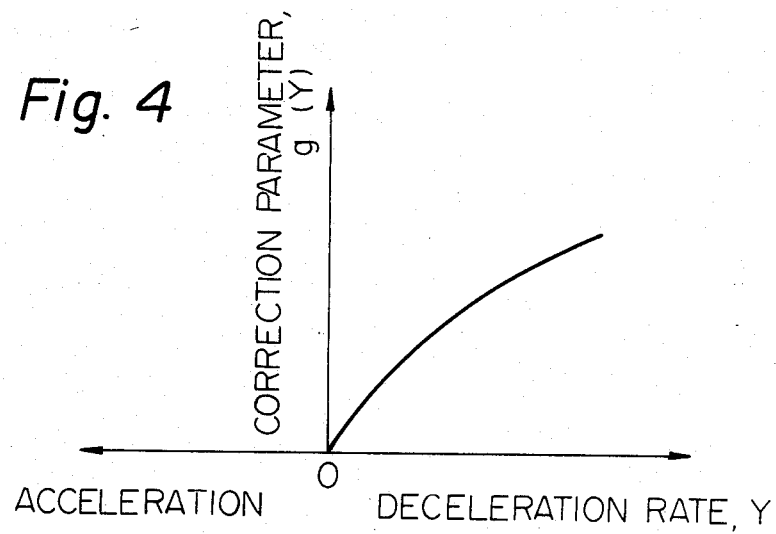
FIG. 4 is a graph showing an example of the relationship between the deceleration rate of the coarse tracking control means and a parameter to correct the pulsewidth of the signal formulated as shown in FIG. 2.

For this purpose, the pulsewidth f(X) of each of the pulses in the motor-drive pulse signal $S_8$ is modified by a correction parameter g(Y) which increases as the deceleration rate Y of the carriage means increases as indicated by plot c in FIG. 4 of the drawings. The modified pulsewidth is obtained by subtracting the correction parameter g(Y) from the pulsewidth f(X) of each of the pulses in the signal $S_8$. For the value /X/ larger than a certain range close to 100, therefore, the deceleration rate Y of the carriage means assumes relatively small values so that the carriage means is driven to move with a force close to the driving force determined by the pulsewidths f(X) of the pulses in the signal $S_8$. When the value /X/ is reduced to the range close to 100 and the deceleration rate Y of the carriage means approaches the maximum value $Y_{max}$, the correction parameter g(Y) assumes relatively large values so that the carriage means is driven to move with a force which is far less than the driving force determined by the unmodified pulsewidths. When the value /X/ is reduced to zero, the driving force applied to the carriage means becomes zero. When the driving force applied to the carriage means thus becomes zero, the carriage means is subjected only to the previously mentioned braking force, which overcomes the force of inertia produced in the carriage means and which makes the speed of movement of the carriage means zero.

Thus, the mode of variation in the pulsewidths of the pulses to energize the carriage-drive motor 17 under conditions in which the carriage means is being driven for movement at relatively high speeds with the value /X/ reduced from, for example, 3000 to 1000 in search of a desired address differs from the mode of variation in the pulsewidths of the pulses under conditions in which the carriage means is being driven for movement with the value /X/ reduced from, for example, 1000. When the value /X/ is reduced from, for example, 3000 to 900, the carriage means is being decelerated so that the modified pulsewidth is smaller than the unmodified pulsewidth f(X) by a value dictated by the correction parameter g(Y). If, on the other hand, the value /X/ is reduced from, for example, 1000 to 900, the carriage means is being accelerated from a rest position so that the correction parameter g(Y) becomes zero as indicated by the plot c in FIG. 4. Under these conditions, the carriage-drive motor is energized with pulses with the unmodified pulsewidths f(X) and, as a consequence, the carriage means is driven to move fast toward the position providing access to the desired address.

When the value /X/ reaches 100, the scanning pulse generator 15 of the system shown in FIG. 1 becomes inoperative and, in the absence of the output signal $S_7$ from the scanning pulse generator 15, there is no drive pulse signal supplied to the carriage-drive motor 17. The carriage or coarse tracking control means is thus made inoperative and brought to a stop. After the value /X/ is reduced to 100, the jump pulse generation control unit 22 is made operative to produce the pulse signal $S_{13}$ so that the jump pulse generator 23 is triggered by the signal $S_{12}$ from the jump timing generator 21 and is enabled to pass therethrough the pulse signal $S_{13}$ from the jump pulse generation control unit 22 to the tracking transducer driver 24. Jump pulses corresponding in number to the value /X/, viz., the difference between the latest address reached by the beam 3 and the address being searched are delivered as the pulse signal $S_{13}$ from the jump pulse generator 23 to the tracking transducer driver 24. The tracking transducer driver 24 is thus made operative to produce the output signal $S_{14}$ to actuate the electromagnetic transducer of the mirror drive unit 8 to drive the tacking mirror 7 to turn with respect to the information-carrying surface of the disc 2. The signal pickup beam 3 incident on the information-carrying surface of the disc 2 is therefore caused to jump over information tracks on the disc 2. While the information tracks on the disc 2 are being scanned by the pickup beam 3 in this manner, the difference between the latest address reached by the beam 3 and the address being searched is being detected by the address comparator 13 and accordingly the number of the jump pulses produced as the pulse signal $S_{13}$ by the jump pulse generator 23 is being varied on the basis of the value /X/ represented by the address error signal $S_6$ thus produced by the address comparator 13. The number of the pulses of the signal $S_{13}$ to be passed through the jump pulse generator 23 is regulated on the basis of the absolute value /X/ thus detected continuedly and as a consequence the signal pickup beam 3 incident on the information-carrying surface of the disc 2 is caused to jump over information tracks at a maximum speed, viz., over a certain number of information tracks such as fifteen or thirty tracks per jump pulse. When the value /X/ is reduced below such a predetermined number, the pickup beam 3 is caused to jump over the tracks of the number corresponding to the remaining difference between the latest address picked up and the address being searched, thus being permitted to the target address.

Figure 6:
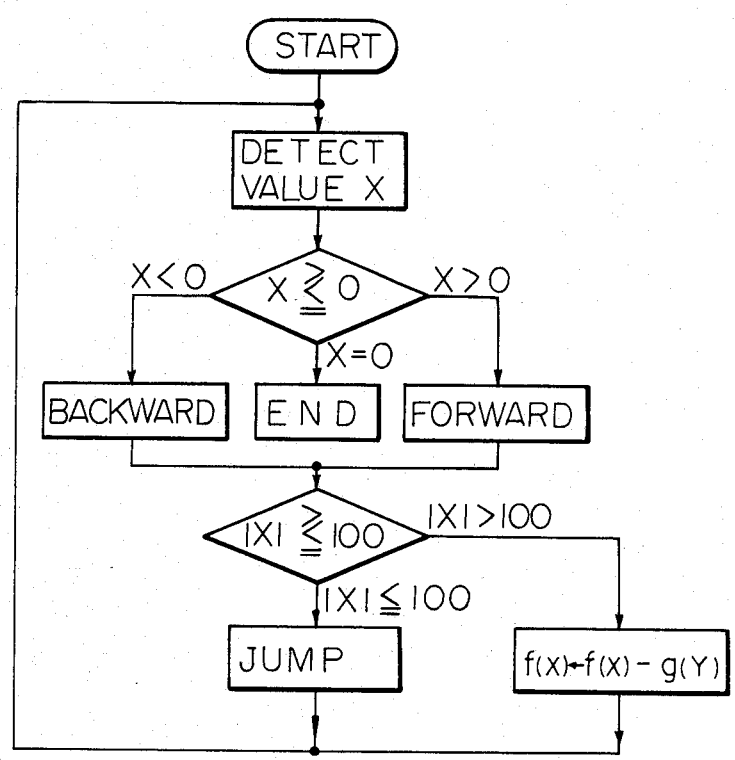
FIG. 6 is a flowchart showing the steps followed to carry out a method according to the present invention in the system shown in FIG. 1.

FIG. 6 of the drawings is a flowchart showing the steps required to search the address in the hereinbefore described manners.

Figure 7:
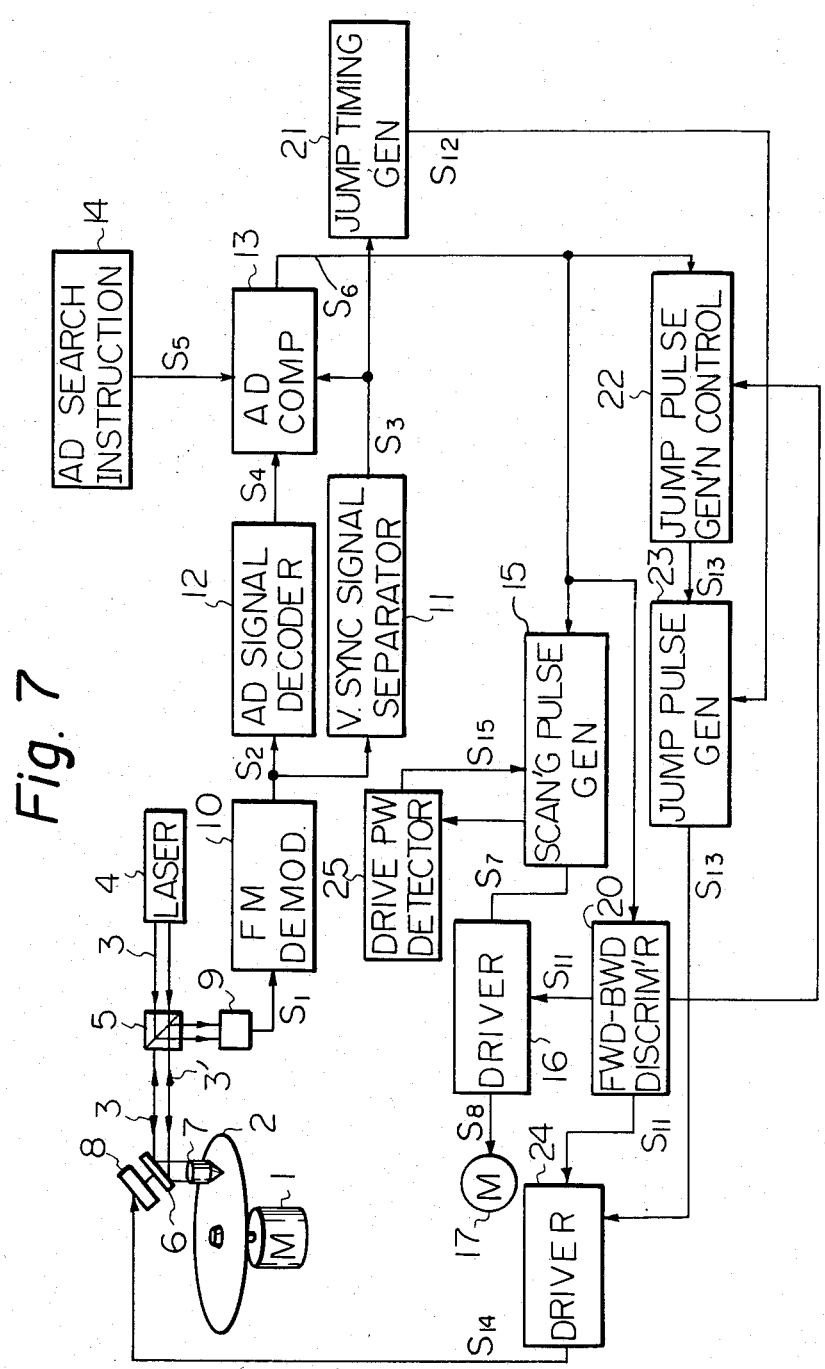
FIG. 7 is a block diagram showing a second preferred example of the system to carry out a method according to the present invention.

FIG. 7 of the drawings shows a modification of the system described with reference to FIG. 1. The modified system comprises a pulsewidth difference detector 25 in lieu of the combination of the frequency generator 18 and the deceleration-rate detector 19 provided in the system of FIG. 1. The pulsewidth difference detector 25 is responsive to the differences between the pulsewidths f(X) of the pulses contained in the output signal $S_7$ from the scanning pulse generator 15 and is operative to produce an output signal $S_{15}$ representative of the differences between the successive pulses in the pulse signal $S_7$ produced by the scanning pulse generator 15. The signal $S_{15}$ thus produced by the pulsewidth difference detector 25 is fed back to the scanning pulse generator 15 so as to modify the pulsewidths of the pulses contained in the signal $S_7$ to be delivered from the scanning pulse generator 15.

In an ordinary video and/or audio disc, only up to several address signals are recorded on each of the information tracks of the disc. During coarse tracking control in which tens to hundreds of information tracks are scanned in response to a single drive pulse applied to the coarse tracking control means, therefore, only several address signals are picked up by the signal pickup beam 3 when the value /X/ is within the range of between 100 to 1000. If, therefore, the difference between the pulsewidth f(X) of the pulse delivered from the scanning pulse generator 15 when an address signal is picked up by the beam 3 and the pulsewidth f(X) of the pulse delivered when the immediately preceding address signal was picked up by the beam 3 is detected, the amount of change of the pulsewidth f(X) per unit time corresponds in effect to the deceleration rate Y of the carriage means. The correction parameter g(Y) to modify the pulsewidths f(X) can be for this reason determined on the basis of such an amount of change of the pulsewidth.

While two preferred examples of the system to carry out the method according to the present invention have hereinbefore been described with reference to FIGS. 1 and 7, such examples are merely for the purpose of illustration and are subject to change and modification.

The system to put into practice the method according to the present invention can thus be realized by the use of a microprocessor or any other computer means if desired and may be used in not only an optical recording and reproducing apparatus but a video and/or audio disc information recording and reproducing apparatus of the capacitance type. It may further be noted that the specific numerical values herein referred to are also by way of example and are not limitative of the gist of the present invention.

What is claimed is:

1. In a video and/or audio disc player including a turntable to have carried thereon a video and/or audio disc to be played back, pickup means to pick up information signals recorded on said disc and containing address signals, a coarse tracking control means operative to coarsely vary the positions of the turntable and the pickup means relative to each other in a radial direction of the disc, and fine tracking control means operative to minutely vary said positions; means for positioning said pickup means at a desired address, comprising:
   means for separating an address signal from the information signal picked up by said pickup means;
   means for detecting a deceleration rate of movement of said pickup means relative to said turntable;
   means for comparing the latest address signal with said desired address and producing an address error signal representative of the difference between the desired address and an address represented by said address signal;
   means for producing a first drive signal which varies in magnitude to drive said coarse tracking control means to move the pickup means relative to the turntable in a direction and over a distance to lessen said difference and at a speed varying in predetermined relationship to the absolute value of said difference, said speed decreasing at a deceleration rate which increases as said absolute value decreases within a predetermined range;
   means for driving said coarse tracking control means in accordance with said first drive signal;
   means for modifying said first drive signal so as to reduce the driving force of said pickup means in predetermined relationship to the detected deceleration rate; and
   means for interrupting said first drive signal and for supplying a second drive signal effective to drive said fine tracking control means when said absolute value is reduced to the lower limit of said predetermined range.

2. The apparatus as set forth in claim 1, in which said first signal consists of a train of pulses having pulsewidths which decrease at a rate increasing as said absolute value decreases within said predetermined range.

3. The apparatus as set forth in claim 2, in which said modifying means reduces said pulsewidths in said predetermined relationship in accordance with the detected deceleration rate.

4. The apparatus as set forth in claim 2, in which said coarse tracking control means is driven by an electric motor in response to said first drive signal and the detection of the deceleration rate of the movement of said pickup means is performed by detecting the rotational speed of said motor.

5. The apparatus as set forth in claim 2, in which the detection of the deceleration rate is performed by detection the variations of the pulsewidths of said pulses.

6. The apparatus as set forth in claim 5, in which said second drive signal consists of a train of jump pulses corresponding in number to said absolute value.

7. A method for use with a video and/or audio disc player including a turntable to have carried thereon a video and/or audio disc to be played back, pickup means to pick up information signals being recorded on said disc and containing address signals, coarse tracking control means operative to coarsely vary the positions of the turntable and the pickup means relative to each other in a radial direction of the disc, and fine tracking control means operative to minutely vary said positions; the method comprising:
- separating an address signal from the information signal picked up by said pickup means;
- detecting a deceleration rate of movement of said pickup means relative to said turntable;
- comparing the latest address signal with said desired address and producing an address error signal representative of the difference between the desired address and an address represented by said address signal;
- producing a first drive signal which varies in magnitude to drive said coarse tracking control means to move the pickup means relative to said turntable in a direction and over a distance to lessen said difference and at a speed varying in predetermined relationship to the absolute value of said difference, said speed decreasing at a deceleration rate which increases as said absolute value decreases within a predetermined range;
- driving said coarse tracking control means in accordance with said first drive signal;
- modifying said first drive signal so as to reduce said driving force in predetermined relationship to the detected deceleration rate; and
- interrupting said first drive signal and producing a second drive signal effective to drive said fine tracking control means when said absolute value is reduced to the lower limit of said predetermined range.

8. The method as set forth in claim 7, in which said first signal consists of a train of pulses having pulsewidths which decrease at a rate increasing as said absolute value decreases within said predetermined range.

9. The method as set forth in claim 8, in which said modifying is performed by reducing said pulsewidths in said predetermined relationship in accordance with the detected deceleration rate.

10. The method as set forth in claim 8, in which the detection of the deceleration rate is performed by detecting the variations of the pulsewidths of said pulses.

11. The method as set forth in claim 10, in which said second drive signal consists of a train of jump pulses corresponding in number to said absolute value.

12. The method as set forth in claim 7, in which said coarse tracking control means is driven by an electric motor in response to said first drive signal and in which the detection of the deceleration rate of the movement of said pickup means is performed by detecting the rotation speed of said motor.

13. In a video and/or audio disc player including a turntable to carry thereon a video and/or audio disc to be played back, pickup means to pick up information signals recorded on said disc which contain address signals, a coarse tracking control means operative to coarsely vary the position of the turntable and the pickup means relative to each other in a radial direction with respect to the disc, and fine tracking control means operative to minutely vary said position; means for positioning said pickup means at a desired address comprising:
- means for separating an address signal from the information signal picked up by said pickup means;
- means for detecting a deceleration rate of movement of said pickup means relative to said turntable;
- means for comparing the latest address signal with said desired address and producing an address error signal representative of the difference between said desired address and address signal;
- means for producing a first drive signal to drive said coarse tracking control means to move the pickup means relative to the turntable in a direction and over a distance to lessen said difference as represented by said address error signal and at a speed which continuously varies in a first predetermined relationship to the absolute value of said difference, said speed decreasing at a rate which increases as said absolute value of said difference decreases within a predetermined range;
- means for driving said coarse tracking control means in accordance with said first drive signal;
- means for modifying said first drive signal by subtracting a correction parameter so as to reduce the driving force of said pickup means, said correcting parameter being based upon the detected deceleration rate obtained via said means for detecting; and
- means for interrupting said first drive signal and for supplying a second drive signal effective to drive said fine tracking control means when said absolute value is reduced in the lower limit of said predetermined range.

* * * * *